United States Patent [19]
Fuqua

[11] 3,822,810
[45] July 9, 1974

[54] BEVERAGE DISPENSING DEVICE
[75] Inventor: Norman L. Fuqua, South Hill, Va.
[73] Assignee: The Cornelius Company, Anoka, Minn.
[22] Filed: Jan. 17, 1972
[21] Appl. No.: 218,399

[52] U.S. Cl. ........................................ 222/146 HE
[51] Int. Cl. ............................................. B67d 5/62
[58] Field of Search ................... 219/214, 366, 368; 222/156 HE; 221/150 HC

[56] References Cited
UNITED STATES PATENTS
1,517,833  12/1924  Gertler et al. ...................... 219/368
1,639,200  8/1927   Pitts .............................. 219/368 X
2,755,000  7/1956   Parre ....................... 222/146 HE X Primary Examiner—Stanley H. Tollberg
Attorney, Agent, or Firm—Simpson, Van Santen, Steadman, Chiara & Simpson

[57] ABSTRACT

A beverage dispsening device for dispensing a stored beverage from a dispensing section of the device, the device having associated therewith means for providing a flow of warm air to the dispensing section via a conduit from a heater element positioned exterior of the dispensing section, the supply relying upon convective flow independent of fans, blowers or the like.

12 Claims, 4 Drawing Figures

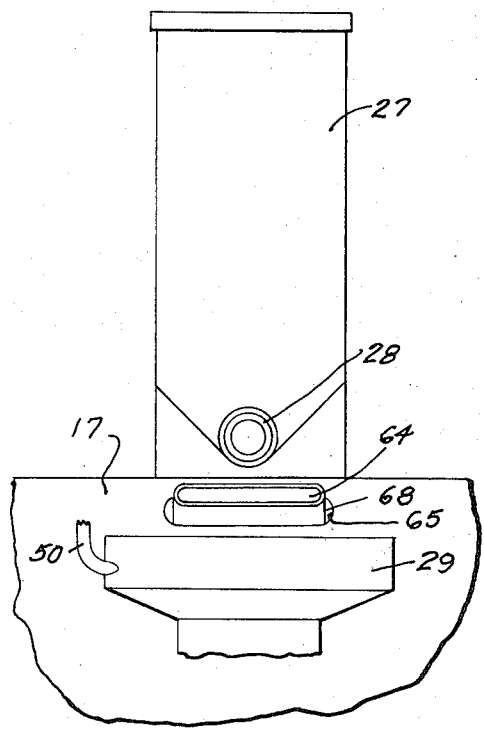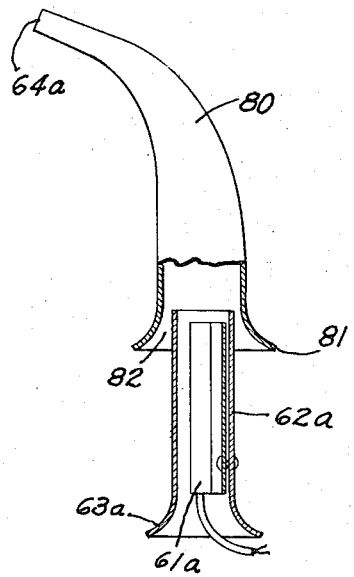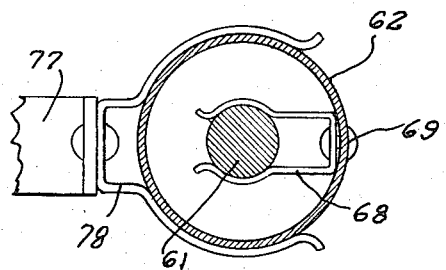

BEVERAGE DISPENSING DEVICE

BACKGROUND OF THE INVENTION

1. Field of the Invention

This invention relates to beverage dispensing devices and more particularly to a system of supplying warm air to the dispensing section of the device.

2. Prior Art

Beverage dispensing devices such as coin-operated machines for dispensing coffee, tea, hot chocolate, and the like hot beverages, generally have a dispensing section within the housing of the device where dry ingredients are stored and dispensed. A dispensing opening from the storage must be located in proximity to the dispensing outlet of the device. The dispensing outlet also receives hot water from a hot water storage area which is mixed with the dry ingredient or ingredients which have been discharged from the storage through the storage dispensing opening to the outlet. As the hot water is released to the dispensing outlet or to a mixing chamber adjacent the outlet for mixing with the dry ingredients, steam and/or other forms of moisture are admitted to the dispensing section. This moisture can adversely affect the dispensing openings from the dry ingredient storage and, indeed, can deteriorate the dry ingredients remaining to be dispensed.

This problem is not unique to hot beverage machines, but is common to all beverage machines using hygroscopic dry ingredients which may become gummy in humid conditions. Cold beverage machines which make use of dry ingredients, such as those that mix water with powdered fruit flavored drinks or which use a dry ingredient to add to the flavor of the beverage such as by way of example a dry ingredient to add carbonation, also have the problems associated with moisture in the dry ingredients storage section of the dispensing section.

It has been suggested to utilize heating devices adjacent the dispensing outlets to reduce or eliminate the problems associated with moisture in the dispensing section. Such prior art devices have generally utilized heating devices positioned within the powder dispensing section. The heating devices normally have fans or blowers associated therewith to blow or withdraw air from the dispensing section. In those devices which have not heretofore relied upon fans, the heating element has been of the exposed type and has been positioned in close proximity to the outlets. In the first instance, the fans have had a number of disadvantages associated therewith, such as blowing beverage ingredients around inside of the dispensing section, being noisy, being unsanitary, requiring an excessive amount of mechanical structure and being subject to mechanical failure. Those devices which did not rely upon fans, but which had exposed heating elements positioned adjacent the outlets, provide safety problems and have generally been characterized by overheating and/or underheating. In addition, most prior art devices have required thermostatic or on-off controls, and have utilized heating elements of high power which have produced heat far in excess of that required, and have generally been unsatisfactory and unable to direct the heated air to those areas where it is most needed.

SUMMARY OF THE INVENTION

My invention overcomes disadvantages inherent in the prior art and provides a novel heating device for use in connection with a beverage dispensing machine which allows the heating element to be positioned remote from the dispensing section of the machine, and which utilizes a conduit to direct a convective flow of warm air to a desired position within the dispensing section.

In the preferred embodiment illustrated, the heater element may be of a standard cylindrical type and is positioned interiorly of a conduit or duct adjacent the lower end thereof. The upper end of the conduit is ported to the interior of the dispensing section and terminates adjacent the dispensing openings of the dry ingredient storage chamber or chambers. Thus, a flow of heated air is provided to the interior of the dispensing section at the desired point within the dispensing section. The location of the heating element at a point remote from the dispensing section avoids contact danger and results in economies of design and construction while at the same time avoiding the necessity of running electrical connections for the heating element into the dispensing section.

The construction, as illustrated in a preferred embodiment herein, avoids the necessity for fans, blowers and the like devices and, because of the ability to use a constant heat device, in most instances avoids the necessity for thermostatic controls and/or on-off switches. The device is usable in a wide variety of beverage dispensing devices including those which do not utilize heated water or dry ingredients. For example, the device could be used in a dispensing machine for milk or other pre-mixed beverages, where the device will function to keep the dispensing section dry and to blow away insects from the dispensing opening.

It is therefore an object of this invention to provide a dispensing section heating device for beverage dispensing devices.

It is another object of this invention to provide a beverage dispensing machine having means to dry an ingredient dispensing opening.

It is a further object of this invention to provide a dispensing section heating device for beverage dispensing machines, the heating element located remote from the dispensing section.

It is a more specific object of this invention to provide a heating device for the dispensing section of beverage-dispensing machines, the heating element being located remote from the dispensing section, the device including a conduit directing a flow of warm air from the heating element to a given position within the dispensing section.

It is a most specific object of this invention to provide a heating device for the dispensing section of a beverage dispensing machine, the heating element being positioned remote from the dispensing section, the device including a conduit directing a flow of warm air from the heating element to a given area of the dispensing section, the flow of air being created solely by convection flow through the conduit, the heating element being located interior of the conduit.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 2 is a fragmentary plan view of a portion of the dispensing section of the beverage machine of FIG. 1, illustrating the terminus of the heating device conduit;

FIG. 3 is a cross-sectional fragmentary view taken along the lines III—III of FIG. 1; and FIG. 4 is a plan view, partially in section, of a modified form of the heating device of this invention.

DESCRIPTION OF THE PREFERRED EMBODIMENTS

Figure 1:
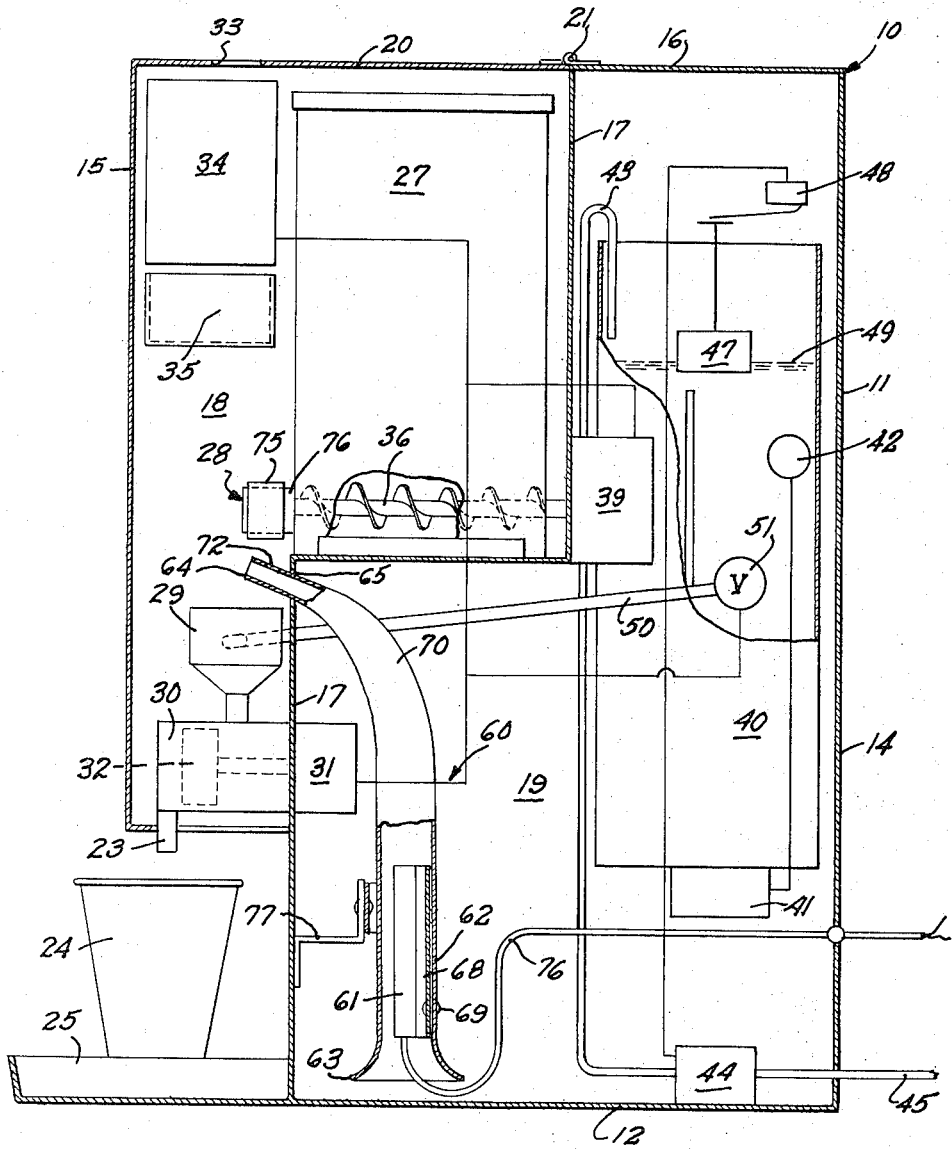
FIG. 1 is a cross-sectional diagrammatic view of a beverage dispensing machine equipped with the heating device of this invention.

FIG. 1 illustrates a beverage-dispensing machine 10 including a housing 11. The housing includes a base portion 12, side walls 14 and 15, and a top 16. An interior stepped dividing wall 17 divides the housing into a dispensing section 18 and a main housing section 19. A portion 20 of the top 16 and the front wall 15 together with enclosing front and back side walls, not shown, are attached to the main housing section as by means of a hinge 21 and are openable to expose the dispensing section.

The dispensing section includes a dispensing outlet 23 from which beverage is dispensed to a dispensing station including, for example, a cup 24 positionable upon a ledge 25.

Interior of the dispensing section 18 is a dry ingredient storage cannister 27 supported by the step in the dividing wall 17, and the cannister 27 has an opening 28 therefrom positioned over a mixing bowl 29 which in turn may be communicated with a whipper type mixing device 30 operated by a motor 31 and including a whipper 32. The whipper device 30 communicates to the outlet 23. The opening 28 of the dry ingredients storage cannister 27 is positioned directly above the mixing bowl 29 so that dry ingredient dispensed from the opening 28 will drop into the mixing bowl 29. It will, of course, be understood that the use of the mixing bowl 29 and of the whipping device 30 is optional and that other types of dispensing designs may be utilized if desired.

The beverage machine illustrated is of the coin-operated type including a coin receiving slot 33 open to a timing device 34 and coin receptacle 35.

The dry ingredients storage cannister 27 is of the type which utilizes a permanently open opening 28, the ingredient being dispensed therethrough by means of an auger 36 positioned within the storage cannister 27 and terminating in the opening 28. The auger is driven by a motor 39 which is actuated by the timing device 34. It is to be understood that although a dry ingredient cannister 27 is illustrated, that a plurality of such cannisters including a plurality of dispensing openings may be provided within the housing of a single machine.

The main housing portion 19 includes a water storage tank 40 which has a heating element 41 associated therewith for maintaining the water within the storage tank at a given temperature. A thermostat 42 controls the heating element 41 and a water inlet 43 controlled by a valve 44 is provided to supply water from a conduit 45 attached to a water source such as a standard tap. A float 47 controlled switch 48 is provided to control the valve 44 to maintain the water level 49 at a desired maximum.

A discharge conduit 50 ported to the interior of the water storage tank 40 connects the tank 40 through a valve 51 to the mixing bowl 29. The valve 51 is controlled by the timing device 34.

In operation, the dispensing machine 10 normally contains a full level of heated water in the water storage tank 40, and contains a selection of dry ingredient in the dry ingredient cannister 27. Operation of the device is initiated by dropping a coin through the coin slot 33 while placing a cup under the dispensing outlet 23. The timing device 34 actuates the motor 39 to rotate the auger 36 thereby dispensing a predetermined quantity of dry ingredient from the opening 28 to the mixing bowl 29. Simultaneously, the timing device 34 opens the valve 51, thereby supplying a predetermined quantity of heated water via the conduit 50 to the mixing bowl 29. The timing device 34 also controls the shutoff of the motor 39 for the dry ingredient cannister together with the shutoff for the valve 51. As predetermined quantities of dry ingredient and hot water are supplied to the mixing bowl 29, and thence to the whipping device 30, the timer actuates the motor 31 of the whipping device to thoroughly blend the ingredients. Thereafter, they are dispensed through the dispensing outlet 23 to the cup 24.

While heated water is being ported to the mixing cup 29 via the conduit 50, steam and other vapor are admitted to the dispensing section 18. This moisture can adversely affect ingredient and hence the effective size of the opening 28 of the dry ingredient cannister inasmuch as that opening is generally of the permanently open type. In fact, any incidence of high humidity within the dispensing section 18 can adversely affect the dry ingredient both in the cannister and in the opening therefrom. For example, if the moisture were sufficient to wet the dry ingredient, the ability of the auger 36 to move the ingredient through the dispensing opening can be adversely affected. Further, even if the auger is free to turn, the damp dry ingredient can stick to the blades of the auger or to the walls of the dispensing opening, thereby reducing the amount of ingredient dispensed to the mixing cup. As a further problem, if the ingredient is first dampened and then dried, it can cake, thereby either closing off the opening 28 or adversely affecting the dispensing therefrom.

In order to prevent this, it has been known to utilize a heating device to maintain the temperature in the storage chamber at a point sufficiently above ambient temperature to dry the area irrespective of the introduction of vapor thereto by an operation of the machine causing heated water to be ported to the mixing bowl 29.

Such prior art heaters have generally been located within the dispensing section and have therefore required additional structure and wiring within that section. Further, they have either required the use of blowers or fans to circulate the air around the dispensing section or they have been placed close to the opening 28 from the dry ingredient storage. In the first case, the fans have generally been noisy, subject to failure due to wear and the like, and have required both additional structure and wiring together with on-off switches and thermostatic controls. In the second instance, where non-blown heaters have been positioned adjacent the dispensing opening, the heaters have generally been of a higher-than-necessary power in order to provide sufficient heat at the dispensing opening without the use of a blower. This creates hot spots and can lead to safety problems.

My invention makes use of the phenomenon of convective flow from a heat source and locates the heater device remotely from the dispensing section with means for flowing the heated air to the desired area of the dispensing section. The heating device 60 of my invention includes a heating element 61 positioned within a conduit 62 and located exterior of the dispensing section 28 and interior of the main housing section 19. The conduit 62 has the lower end thereof 63 located within the main housing section 19 and the upper end or outlet end 64 located within the dispensing section 18. The conduit passes through an opening or aperture 65 in the interior dividing wall 17.

The heating element 61 is preferably an elongated cylindrical cartridge of standard type and is retained within the conduit 62 by frictional engagement with a resilient spring clip 68 which extends substantially the full length of the heater element 61, thereby forming a secondary heating surface as an extension of the element. The clip 68 is attached to the interior of the conduit as by means of rivets 69 or the like fasteners and is preferably positioned interiorly of the lower end 63 which may be flared out from the diameter of the conduit to aid in air flow. The conduit preferably is tubular and may be formed of regular section metal tubing such as, by way of example, a one-inch steel electrical conduit. The conduit is preferably positioned vertically within the machine and has a bent portion 70 positioned intermediate the ends 63-64, whereby the outlet end 64 is positioned at an angle to the main body. To increase air velocity, the cross-sectional area of the conduit may decrease towards the outlet end 64 and, as illustrated in FIG. 2, may be flattened from circular. Preferably, the opening 65 is positioned below the opening 28 from the dry storage cannister and the outlet end 64 of the conduit terminates with respect to the opening 28 so that the air flow from the conduit will pass approximately perpendicularly through the flow of ingredient from the cannister to the mixing bowl 29. An additional opening 72 may be provided adjacent the open end 64 of the conduit, the additional opening being directed towards the dry storage opening 28 so as to maintain the outlet warm to prevent caking or moisture deterioration of the dry ingredients adjacent the outlet. A metal collar 75 may be positioned around the opening tube 76 to aid in distribution of heat around the opening. Of course, the air flow from the open end 64 will circulate through the dispensing section 18, keeping it dry.

The heater is preferably of the constant "on" type and is connected via electrical wiring 76 to a standard electrical source for the machine.

Since the thermal efficiency of the heating element 61 can be predetermined, a constant supply of warm air to the dispensing section 18 is obtainable, the supply being controllable by choice of size of the heating element to assure that overheating of the dispensing section will not occur.

The conduit can be attached to the machine in any desired way as for example, by means of a bracket 77 and clip attachment 78, as illustrated.

FIG. 4 illustrates a modified form of this invention wherein the heater element 61a is received in a conduit 62a having a flared end 63a. The conduit 62a terminates at a point intermediate the ends 63a and an outlet 64a. A secondary conduit member 80 is positioned around the end of the first conduit remote from the flared end whereby the first conduit 62a projects into the open flared end 81 of the second conduit, providing a secondary opening 82 intermediate the ends 63a, 64a to enhance the flow of air. The secondary conduit 80 may be integral with the first conduit 62a and the opening 82 may consist of an opening to the single conduit intermediate the ends, positioned above the heater element.

Preferably, the heater element maintains a discharge temperature through the outlet end 64 of the conduit which is higher than the vapor temperature from the discharged hot water to the mixing bowl. For example, if the water discharge is approximately 175° F., then the air discharge from the outlet end 64 would preferably be about 195° F. In this manner, a flow of air which is hotter than the flow of vapor is created, whereby the flow of vapor will not penetrate the air flow and therefore will not reach the opening 28 to the dry ingredient storage.

It will be appreciated that the efficiency of my disclosed heater assembly is greater than the prior art devices in that substantially all of the heat is transferred to an air flow which is directed to the desired area of the machine, rather than being conducted to associated structure of the machine or to other areas.

Since the primary part of the machine to be warmed is the opening to the dry ingredient storage, the airflow is directed past that spot. Thereafter, the airflow is used to maintain temperature in the dispensing section 18 of the machine, reducing the relative humidity level in that area.

It will therefore be appreciated from the above that my invention provides a heating device for beverage dispensing machines wherein the heating element is positioned in the machine in an area remote from the dispensing section, the heating element creating a convective flow of warm air which is directed to a given area of the machine, preferably adjacent the dry ingredient dispensing opening within the dispensing section. The heating device does not rely upon the use of fans, blowers or other devices, and utilizes a tubular heating element positioned within a conduit to create a convective flow of warm air through the conduit, the conduit terminating at the desired point for release of the flow of warm air within the dispensing section. It will be appreciated that although I have disclosed my heating device as used in connection with a specifically designed beverage dispensing machine, that the principles of my invention are not to be so limited and that my device can be used with beverage-dispensing machines having different designs and arrangements of interior mechanisms.

Although the teachings of my invention have herein been discussed with reference to specific theories and embodiments and although illustrative means for accomplishing explained results have been described, it is to be understood that these are by way of illustration only and that others may wish to utilize the invention in different designs or applications.

I claim as my invention:

1. A beverage ingredient dispensing device comprising:

a. a housing having an apertured wall dividing the interior thereof into a dispensing section and a separate main section;
b. a dry-ingredient dispensing cannister supported by said dividing wall and having a discharge opening in said dispensing section;
c. a vertically arranged elongated conduit having open ends and disposed primarily within and enclosed by said main housing section, the upper end thereof extending through the aperture in the dividing wall and terminating adjacent to and below said discharge opening; and
d. a heating element disposed in said conduit adjacent the lower end thereof for creating a convective flow of heated air discharging into said dispensing section.

2. A dispensing device according to claim 1 in which said heating element is vertically elongated.

3. A dispensing device according to claim 2 which includes a vertically elongated clip embracing said heating element in heat-transfer relationship and secured to said conduit, whereby said clip assists in heating said air.

4. A dispensing device according to claim 3 in which said clip and said heating element are substantially coextensive in the vertical direction.

5. A dispensing device according to claim 1 in which the cross-sectional area of the upper end of said conduit is reduced.

6. A dispensing device according to claim 1 in which said upper end of said conduit projects through the dividing wall aperture.

7. A beverage mixing and dispensing device according to claim 1 having:
    a. a water storage tank arranged to dispense hot water adjacent to said cannister discharge opening; and
    b. means for maintaining the temperature of the water in said tank at a temperature below that of the heated air discharged into said dispensing section.

8. A dispensing device according to claim 6 including an attachment clip secured to said housing and embracing the lower end of said conduit.

9. A dispensing device according to claim 1 which includes a first clip detachably embracing said heating element and secured to said conduit, and a second clip detachably embracing said conduit and secured to said housing.

10. A dispensing device according to claim 1 in which said upper end of said conduit has a plurality of air outlets, at least one of which is positioned to direct the heated air towards said cannister discharge opening.

11. A dispensing device according to claim 1 in which said conduit has a second inlet intermediate its ends and disposed in said main section of said housing.

12. A dispensing device according to claim 11 in which said conduit has two separate aligned body sections, one of said body sections projecting into an end of the other body section with an annular clearance therebetween which provides said second inlet.

* * * * *